Aug. 16, 1960

W. L. LEHNER ET AL 2,949,184

SOCKET PACKAGE

Filed Oct. 22, 1956

2 Sheets-Sheet 1

INVENTORS
CARL F. CARLZEN
WILLIAM L. LEHNER
BY
Norman J. O'Malley
ATTORNEY

Aug. 16, 1960    W. L. LEHNER ET AL    2,949,184
SOCKET PACKAGE

Filed Oct. 22, 1956    2 Sheets-Sheet 2

INVENTORS
CARL F. CARLZEN
WILLIAM L. LEHNER
BY
Norman J. O'Malley
ATTORNEY

United States Patent Office 2,949,184
Patented Aug. 16, 1960

2,949,184
SOCKET PACKAGE

William L. Lehner, Snyder, and Carl F. Carlzen, Buffalo, N.Y., assignors, by mesne assignments, to Sylvania Electric Products Inc., Wilmington, Del., a corporation of Delaware Filed Oct. 22, 1956, Ser. No. 617,425

4 Claims. (Cl. 206—65)

This invention relates generally to packaging and more specifically to packaging of sockets.

In the highly competitive field concerned with the manufacture of electrical or electronic circuitry, it has become desirable to assemble or place components on circuit bases by automatic devices which can be relied upon to provide a degree of uniformity as well as an assembly rate far beyond that attained to date by other means. Machines have been developed to meet this need which generally require components having a high degree of uniformity. Thus machines for inserting or assembling sockets to a circuit base require sockets having a socket body manufactured to close tolerances incorporating solder lugs, positioned relative to the socket body with similar positioning tolerance requirements. In other words, present day inserting machines have difficulty in handling sockets unless the solder lugs used therein are positioned relative the socket body as they were when manufactured.

To date there have been few if any answers to this packaging problem which affords the necessary protection to socket solder lugs, at a reasonable cost. Sockets have been and are continuing to be shipped loose in relatively large containers forcing those who manufacture circuit assemblies to inspect and straighten bent solder lugs before use in automatic circuit assembling equipment.

An economic answer to this problem which would afford reasonably low cost packaging with sufficient protection to solder lugs, is desirable.

Thus it is an object of this invention to overcome the aforementioned difficulties in socket packaging at relatively low cost.

It is a further object of this invention to provide stacked sockets which can be used directly in circuit assembly machines without extensive inspection and repair of socket parts.

It is still a further object of this invention to stack sockets in a manner readily adaptable for handling by the socket manufacturer and immediately adaptable for use by the user in automatic circuit assembly equipment.

Figure 1:
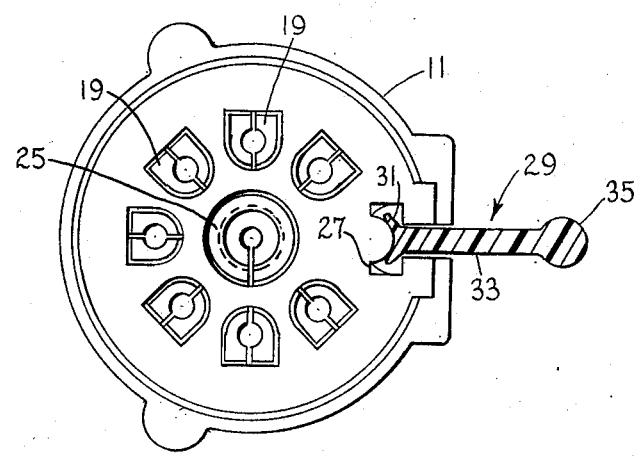

For a better understanding of the invention, together with other and further objects, advantages and capabilities thereof, reference is made to the following description and appended claims in connection with:

Fig. 1 which is a top view of the preferred embodiment; and

Figure 2:
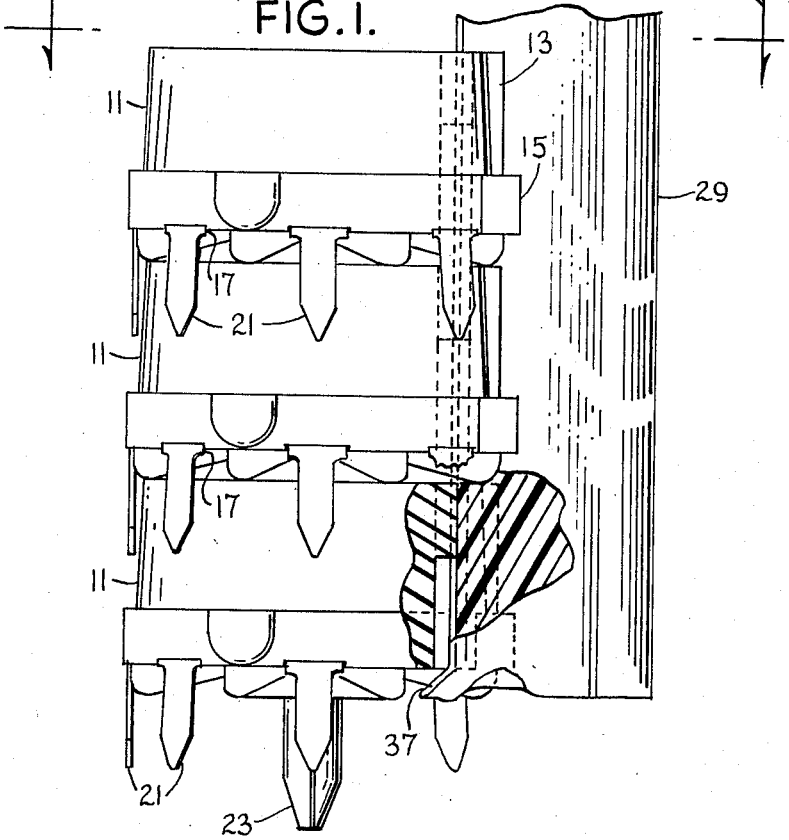

Fig. 2 which is a side view of the Fig. 1 embodiment; and

Figure 3:
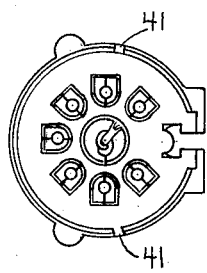

Fig. 3 which is a top view of another embodiment; and

Figure 4:
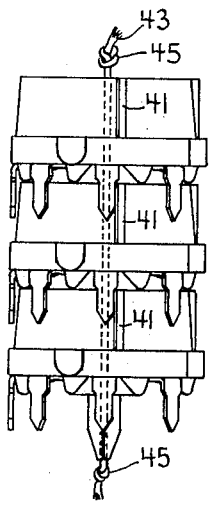

Fig. 4 which is a side view of the Fig. 3 embodiment; and

Figure 5:
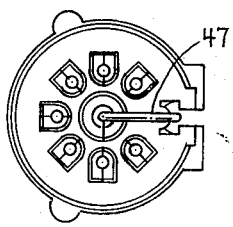

Fig. 5 which is a top view of a locked embodiment; and

Figure 6:
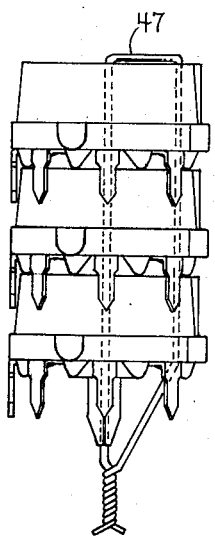

Fig. 6 which is a side view of the Fig. 5 embodiment; and

Figure 7:
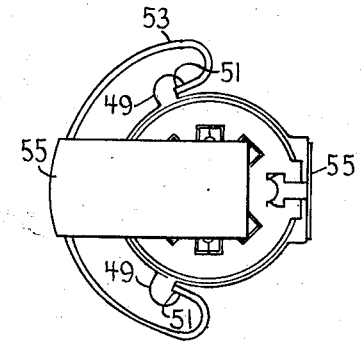

Fig. 7 which is a top view of an embodiment using tape stops; and

Figure 8:
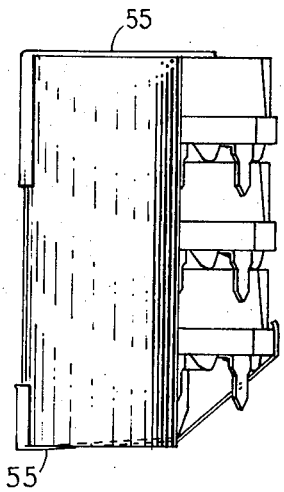

Fig. 8 which is the side view of the Fig. 7 embodiment.

Briefly, one aspect of the invention comprises a holding strip slideably blocked at both ends and engaged with a vertical aperture through a portion of the body of each of a plurality of stacked sockets.

For a more detailed explanation, reference is made to Fig. 1 where there is shown a top view of a socket disclosed in the application for United States Letters Patent, Carlzen et al., Serial Number 479,518, filed January 3, 1955, now Patent No. 2,863,131, granted December 2, 1958. Though this particular socket is shown for purposes of explanation, it will become clear to those skilled in the art that the invention is applicable to packaging of sockets having other shapes and attributes.

As is brought out in the above mentioned application, Serial Number 479,518, the socket housing 11 is generally frustro-conical in shape having a tapered upper portion 13 and a wider base portion 15. Solder lugs 17 which are seen to depend from the socket base portion 15 are connected to the internal pin receiving contacts 19 through slots in the bottom surface of base portion 15 and are formed to extend radially adjacent the bottom surface of base portion 15 and then bent downward to form the inserting legs 21. As can be seen in Fig. 2 the inserting legs 21 extend substantially vertically from the bottom surface of the socket body 11, to terminate external the horizonal projection of the top surface of the upper portion 13 of socket body 11. Some sockets may include a center shield shown generally at 23 having a lower portion extending below the socket base portion 15. The upper portion of the shield can be seen in Fig. 1 at 25 to be of sufficient diameter so as to receive the lower portion of any other socket stacked thereupon. The resulting socket shown can be said to be of stackable type.

The socket is also provided with an indexing slot or vertical aperture 27 having a generally T-shaped cross section which extends vertically along the outer periphery of both the upper portion 13 and the base portion 15 of the socket body 11. Indexing slot or aperture 27 can be formed so as to receive a shield can ground strap as is more clearly brought out in the aforementioned application Serial Number 479,518.

The socket holding portion of packaging strip 29 is formed to provide a cross section having a generally T-shaped portion 31 including web portion 33 which terminates in a strengthening round 35. It can be seen that the forward edge portions of the T-shaped section 31 fits into the indexing slot 27 so that sockets supported thereon are or may be slideably related to the packaging strip 29.

Sockets may be packaged on strip 29 in many ways. For example, if the strip is selected from flexible material, it is possible to provide a long coil holding hundreds of sockets in one continuous stack. It is also possible to use shorter and more rigid lengths of strip 29 which support only a relatively few sockets such as fifty or more. In any event the bottom socket must be blocked from dropping off of strip 29. This may be done by providing a socket stop portion, e.g., either deforming the bottom portion of strip 29 as at 37 so that the sockets cannot slip off or by providing an additional stop member beneath the last socket.

In the embodiment shown in Figs. 3 and 4 the socket shape is generally similar to the socket shown in Figs. 1 and 2 except for the orienting bosses 41 which, as can be seen from the drawings, keep the sockets in the stack from rotating relative to each other, once properly oriented. More than one such boss may be utilized on the socket body, or if desired other body or solder lug shapes may be provided for locking the sockets against individual rotation once stacked. The package is completed by threading a tension means such as line 43 through a continuous vertical socket aperture, which as shown may be through the center shield. When line 40 is either knotted or distorted as at 45, the package is completed.

Sockets generally of the shape shown and described in connection with Figs. 1 and 2 may be also packaged as shown in Figs. 5 and 6. There, as can be seen, a line 47 is provided which is inserted through two vertical apertures in the socket stack. In the socket shown, one of these apertures is through the center shield and the other aperture is through the side indexing slot. When the two ends of line 47 are joined, the socket package is completed against undesirable movement in transit.

The embodiment shown in Figs. 7 and 8 may be used in conjunction with a socket body of slightly different configuration than that shown in Figs. 1 and 2. In this embodiment, lugs 49 are provided with slots 51. A generally C-shaped strengthening strip member 53 is provided which slideably engages each of the slots 51 in the socket stack and the package is completed by the addition of tape strips 55 at the stack top and bottom.

The complete package affords a low cost means for handling sockets for use in automatic assembly machines. At the assembly machine the socket package may be directly inserted in holding turrets either before or after the securing or strengthening strip is removed. Thus, solder lugs are protected and socket orientation maintained throughout. An assembly machine of the type in which such a socket package is extremely useful is disclosed in application for United States Letters Patent, Carlzen et al., Serial Number 617,426, filed on even date herewith, now Patent No. 2,928,165, granted March 15, 1960.

While there has been shown and described what is at present considered a preferred embodiment of the invention, it will be obvious to those skilled in the art that various changes and modifications may be made therein without departing from the appended claims.

Having thus described the invention, I claim:

1. A socket packaging comprising the combination of a plurality of similar sockets in stacked oriented array, said sockets each having contact apertures, downward depending solder lugs and a vertical aperture joined to the outer side surface by an opening narrower than the width of said vertical aperture, each of said sockets also having a body formed to allow a portion of the length of the socket body internal the contact apertures to nest within the solder lugs of the adjacent upper socket in the stack, a packaging strip extending from the top to the bottom of the socket stack through said vertical aperture in each socket, said strip having a forward edge larger than said opening positioned internal said vertical socket aperture and means positioned at the ends of said strip for preventing sliding movement of said sockets relative to said strip.

2. A socket packaging comprising the combination of a plurality of similar sockets in stacked oriented array; said sockets each having a socket body formed to provide a vertical aperture joined to the outer side surface of the socket body by an opening narrower than the width of said vertical aperture; a packaging strip extending from the top to the bottom of the socket stack through said vertical apertures; said strip having a forward edge, larger than said opening, which is positioned internal the vertical socket apertures; and means positioned at the ends of said strip for preventing sliding movement of said sockets relative to said strip.

3. A socket packaging comprising the combination of a plurality of similar sockets in stacked oriented array; said sockets each having a socket body formed to provide a vertical aperture joined to the outer side surface of the socket body by an opening narrower than the width of said vertical aperture; a packaging strip extending from the top to the bottom of the socket stack through said vertical aperture in each socket; said strip having a forward edge, larger than said opening, which is positioned internal the vertical socket apertures.

4. A socket packaging comprising the combination of a plurality of similar sockets in stacked oriented array, said sockets each having a socket body formed to provide a vertical aperture joined to the outer side surface of the socket body by an opening narrower than the width of said vertical aperture, and a packaging strip having a socket stop portion at least at one end and a socket holding portion formed to provide a forward edge larger than said opening, said socket holding portion extending from the top to the bottom of the socket stack with the forward edge of the strip being positioned internal said vertical socket apertures.

References Cited in the file of this patent

UNITED STATES PATENTS

| | | |
|---|---|---|
| 1,077,235 | Wagandt | Oct. 28, 1913 |
| 2,062,098 | MacChesney | Nov. 24, 1936 |
| 2,455,324 | Wagstaff | Nov. 30, 1948 |
| 2,685,970 | Springer et al. | Aug. 10, 1954 |

OTHER REFERENCES

Sylvania, Tele-Tech publication (page 4), June 1954.